Jan. 3, 1928.

J. A. STEVENS 1,655,210

SHOCK ABSORBER

Filed Nov. 5, 1926

Inventor
John A. Stevens
by Roberts Cushman Woodberry
Att'ys.

Patented Jan. 3, 1928.

1,655,210

UNITED STATES PATENT OFFICE.

JOHN A. STEVENS, OF LOWELL, MASSACHUSETTS, ASSIGNOR TO STEVENS PRODUCTS COMPANY, OF LOWELL, MASSACHUSETTS, A CORPORATION OF DELAWARE.

SHOCK ABSORBER.

Application filed November 5, 1926. Serial No. 146,357.

This invention relates to shock absorbers for vehicles and other uses and more particularly to improvements in fluid compression devices or shock absorbers of the hydro-pneumatic type embodying dash-pot action together with cushioning by means of fluid pressure.

The type of shock absorber which employs a gas, such as air, under pressure for cushioning shocks or jars together with a liquid dash-pot or hydraulically operated checking means for retarding the movements of the shock absorber are particularly ineffective in counteracting or smoothing out severe jolts, or a series of sudden jolts for the reason that this form of compression device as heretofore produced acts sluggishly or slowly, which is due to the inherent nature or action of the resistance ports employed in the device. In this form of device sluggish action can not be rectified or improved by enlarging the resistance ports for the reason that although by this means the shock absorber will be more effective in operation in connection with the more severe jolts, it would be practically ineffective for slight jolts and the vehicle would be subjected to more or less continuous vibrations in passing over the ordinary uneven surfaces.

The forms of device heretofore employed of the type above referred to are particularly subject to leakage of pressure fluid because of the difficulty of confining the fluid under the high pressure which is employed and which is necessary in order to provide for the usual variations in load to which trucks and busses, particularly the more modern double decked busses, are subjected.

The cushioning which is produced under light loads or even with ordinary loads by shock absorbers in which high pressure fluid is employed is particularly ineffective and the operation of such shock absorbers is therefore unsatisfactory. Many unsuccessful attempts have been made to overcome the defects of shock absorbers of this type, and in connection with lighter vehicles this form of shock absorber has frequently been replaced by the all-spring form of shock absorber. This form of shock absorber however while being satisfactory for light loads is not adapted for use in connection with heavy busses or trucks, which are subjected to change from no load to loads of about 5000 pounds in the case of busses, and usually from no load to about 10000 pounds in the case of trucks. The all-spring form of shock absorber is unadapted for busses or trucks carrying such heavy loads because of the fact that the vibrations which were set up were not effectively dampened even by the use of auxiliary snubbers. Under heavy loads this form of shock absorber is wholly ineffective in connection with shocks of unusual severity because of the coming together of metallic parts which is liable to cause breakage of the shock absorber or the parts to which it is connected.

As a result of a large number of experiments upon various types of shock absorbers I have devised means which are practically effective in connection with shock absorbers of the pneumatic or hydro-pneumatic type, by means of which such shock absorbers may carry loads greatly in excess of the ordinary loads and provide effective cushioning even under the heaviest loads without danger of the coming together of metallic parts. Moreover by the means which I have devised a comparatively low fluid pressure may be employed in the shock absorber cylinder so as to minimize the danger of leakage. Furthermore the means which I have devised is so arranged as to be inoperative under ordinary or light loads and to come into action only with loads greater than a predetermined load or in the case of encountering unusually severe jolts. The device provides also means for assisting in checking the rebound in a shock absorber so that the rebound is taken up not only by means of the hydraulically operating dashpot but by means operating entirely independently thereof. The means which I have devised provides therefore for independently adjusting the means for taking up the rebound whereby the device may be so adjusted that a rapid operation will take place, the device not only being effective on light loads but also under the heavier loads so as substantially to prevent the shocks or jars due to the inequalities in the road over which the vehicle passes.

One of the objects of my invention is to provide improvements in shock absorbers of the hydraulically operated type by which the device is rendered more effective in operation and by means of which it is adapted not only for light loads but also for the heaviest loads to which the vehicle may be subjected.

Another object of the invention is to provide improvements in shock absorbers of the form having combined pressure fluid and hydraulic or dash-pot operation whereby the dash-pot portion of the device may be speeded up and the effectiveness of the shock absorber increased so as rapidly to absorb or overcome the recoils or jars to which the vehicle is subjected.

Another object of the invention is to provide a means which is normally ineffective and which will not interfere with the operation of the device with which it is connected under normal conditions but which becomes effective upon overload or in the case of a leakage of pressure fluid or of the decrease of pressure fluid in the device.

Another object of the invention is to provide in the hydraulically controlled form of shock absorber positive means to assist in cushioning the rebound of the shock absorber.

With these and other objects in view the invention comprises the various features herein described and defined in the claims.

The invention is illustrated in its preferred form in the accompanying drawings in which:

Fig. 3 is a detail section of the plunger on the line 3—3 in Fig. 1.

Figures 1, 2, 5:
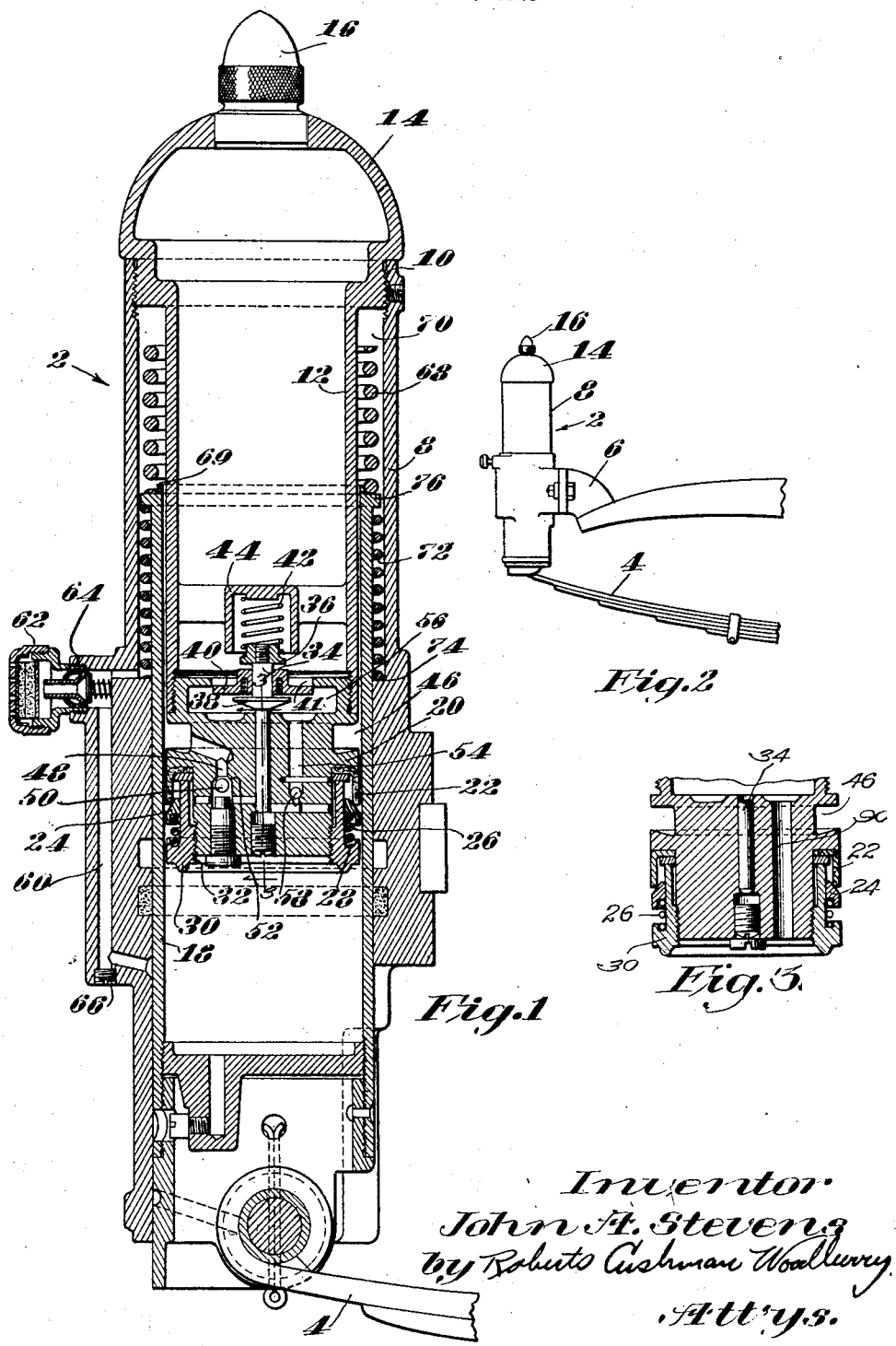
Fig. 1 is a cross sectional view in elevation of a shock absorber embodying my invention.
Fig. 2 is a view illustrating the manner in which the device may be mounted.

Referring more in detail to the drawings the numeral 2 designates the shock absorber as a whole, which may be attached or connected in the usual way to a leaf spring 4 and a bracket 6, by means of which it may be connected to the chassis of a vehicle or other body to which it is to be applied. The numeral 8 designates the outside casing of the shock absorber to which the bracket 6 may be attached as indicated more particularly in Fig. 2. The outer cylinder or casing 8 is attached preferably by a screw-threaded connection 10 to an inner cylinder 12 which has a head or cap portion 14 in which is the usual valve 16, by means of which pressure fluid may be forced into the device. Mounted so as to slide between the cylinders 8 and 12 is an intermediate cylinder member 18, which is directly connected to the leaf spring 4. The lower portion of the inner casing or cylinder 12 is of a size so as to fit tightly within the cylinder 18, thereby serving as a guide member for the sliding cylinder during relative movements of the cylinder 18 and the cylinders 12 and 8. The cylinder 12 has connected thereto a plunger or piston 20 which carries a cup leather packing 22 so as to provide a tight sliding joint between the piston and the inner surface of the cylinder 18. The cup leather packing may be pressed into engagement with the inner surface of cylinder 18 by means of a conical expander or ring 24, which is pressed upwardly by means of a spring member 26. The spring is preferably seated in a groove 28 in the base of a threaded nut 30, which is preferably attached in place on the lower end of the piston by means of screw-threaded connections 32. The piston 20 is preferably provided with a movable plunger 34 which serves as a single acting pump during operation of the shock absorber to pump oil from passageway 46 to passageway 54 in its downward movement. On the upper part of the pump plunger 34 are two collars 36 and 38 which are secured to the plunger. Between the two collars is a disk member 40 which is free to slide on the pump plunger and adapted to engage an opening 41 in the piston 20. Above the collar 36 is a coil spring 42 which bears on one side against a stationary member or holding member 44, connected to the inner cylinder 12, and which presses downwardly on the collar 36 so as to hold the screw plunger yieldably in contact with a screw plug at the lower end of the plunger 20.

In the upper portion of the piston 20 is an annular chamber 46 which is in open communication with the inner surface of the cylinder 18, this annular chamber serving to catch oil that leaks past the packing 22 due to the pressure within the device. Between the bore in which the plunger 34 moves and the annular chamber 46 is a passageway 48 in which is a ball valve 50 adapted to seat upwardly against the seat 52 and in the passageway 54, which connects the bore in which the plunger moves with the space 56 in the upper portion of the piston, is a ball valve 58. When plunger 34 rises, oil is drawn past valve 50 into the bottom of the plunger opening and when the plunger again descends, this oil is forced past valve 58 into passageway 54, thereby returning leakage oil to the main body of oil. It is accordingly obvious that the plunger 34 cooperates with the check valves 50 and 58, and the related passages in returning oil from the groove 46 to the main body of oil. This function is highly desirable since, otherwise, in the course of time, a considerable body of oil would tend to form above the packing and would eventually serve to choke the breather mechanism 64.

In the walls of the cylinder 8 is a passageway 60 leading from the lower portion of the cylinder into the space between the cylinder 18 and cylinder 8, which is connected to the usual form of breather 62, having a valve 64 connected thereto, thereby providing for the admission of filtered air. At the lower end of the passageway 60 is an oil plug 66 which may be removed for the purpose of injecting oil into the duct or passageway 60 for lubricating purposes. The device thus far described is of known construction and operation need not therefore be described in detail, a device of this general character being disclosed for example in the patent to Lieubau, No. 1,519,851.

In the space between the cylinders 8 and 12 and preferably mounted on the cylinder 18 is a superimposed load spring 68 which is of such a length that when the cylinder is inflated to the normal pressure so as to carry the normal load the spring will be free, or in other words there will be no load on the spring. The spring 68 is preferably mounted upon the upper surface of the cylinder 18 being held in place by means of a flange or circular projection 69. The spring is preferably of such a size and is so mounted that it will carry a portion of the load only after a predetermined maximum load to be carried by the pneumatic pressure has been reached. With loads in excess of this predetermined load a proportional part thereof will be carried by the spring the amount carried depending upon the size or strength of the spring and the amount of its deflection from its no load position. As the telescoping cylinders move closer together the air pressure or fluid pressure becomes greater, the pressure exerted by the gas or air being proportional to the decrease in volume in the shock absorber, in accordance with the well known law of gases. If, for example, through the addition of load to the vehicle the shock absorber is compressed to one-third of the volume occupied by the air or gas under normal load, then the pressure exerted by the gas at this load will be three times that exerted under normal load. If the length of the spring 68 is so positioned with relation to the inner cylinder 18 and the top of the inner chamber 70 that the spring will be compressed when the normal or ordinary load is exceeded then if the spring has been compressed for example to the position at which the pressure exerted by the pressure fluid is three times that at the normal load position, the force exerted by the spring will be an amount depending upon the spring constant and the distance which the spring has been compressed; in other words, the force exerted by the spring will be a constant multiplied by the deflection of the spring from its no load position. The load on the vehicle will therefore be carried partly by the spring and partly by the pressure of the fluid in the cylinder in cases where the load is in excess of the normal or predetermined load, the proportion of the load carried by each depending upon the volume of the cylinder, the spring constant and other well known factors. When a sudden load is impressed upon the absorber through the vehicle passing over a bump in the road, for example, the jolt is taken up by both the spring and the fluid compression in the shock absorber. In order to assist in cushioning the shock absorber in its return movement to the normal position, I provide a spring 72 which is preferably mounted in a space between the cylinder 18 and the inner surface of the cylinder 8, the spring being of such a size as to substantially fit around the cylinder 18. The spring is preferably seated at its lower end on a shoulder 74 formed at substantially the mid-portion of the outer casing or guide member 8. At the upper end of the cylinder 18 is an outwardly extending annular ring or projecting portion 76 on which the upper portion of the spring 72 is adapted to seat. In the downward movement of the cylinder 18 relative to the outer cylinder 8, or in other words during the rebound of the shock absorber, the spring member 72 is compressed and assists in neutralizing the force of the rebound. The neutralization of the rebound force is also partly accomplished by means of the flow of oil through the piston to cushion the downward movement of the cylinder 18. During the upward or opposite movement of the cylinder 18 the oil in the lower portion of the cylinder is forced upwardly through the oil passageways in the piston 20, and thus assists in preventing vibration of the device.

In using the shock absorber it is first charged with oil or other sealing liquid while in the collapsed position through the opening or valve 16 in the head 14, the cylinder being filled preferably to a height above the lower edge of the member 44. The shock absorber is then inflated with air or other pressure fluid through the valve under the cap 16, the air pressure which is preferably employed being sufficient to carry the average or ordinary load. When the device is operated through compression thereof, the relative downward movement of the piston 20 causes a current of oil to flow through passageway 90 (Fig. 3) in the plunger into the passageway 56 in an upward direction which causes the disk 40 to be raised until it strikes the collar 36, lifting the pump plunger 34 against the force of the spring 42. When the shock absorber expands or moves in the opposite direction the oil will flow downwardly through the passageway 56 whereby the disk 40 will be carried in the reverse or downward direction, until it strikes the collar 38 which forces the oil pump 34 to the bottom of the stroke causing the oil which was drawn into the pump in the reverse movement to be discharged back into the interior of the shock absorber. During the compression movement of the shock absorber air will be drawn through the breather 62 into the annular space between the cylinders 18 and 8, and when the shock absorber is again expanded the air will be forced downward through the duct 60 and outward between the cylinders thus expelling any dirt or foreign particles which may have become lodged between the cylinders.

By the use of the means which has been described, shock absorbers of the hydro-pneumatic type may be caused to act rapidly and efficiently on heavy or light loads, or on intermediate loads producing a smooth noiseless operation, in place of the snapping or cracking sound generally produced by shock absorbers of this type when the vehicle to which they are attached receives a sudden jolt. Moreover, by the use of a pressure in the cylinders which is designed to carry the average load instead of the heaviest load to which vehicle may be subjected the difficulties produced in confining the high operating pressures are obviated, and the riding qualities of the vehicle are greatly improved. Furthermore, by the use of moderately low pressure in place of the high pressure heretofore generally employed the danger of leakage of the cushioning fluid from the shock absorbers is reduced to a minimum and through the combination with the auxiliary cushioning or supporting means which become operative only with excessive loads or in the case of unusually severe jolts, the vehicle to which they are attached ride with the same evennesss both loaded and unloaded.

It is to be understood that the form of the device which has been described may be varied as will be apparent to those skilled in the art without departing from the spirit or scope of the invention as defined in the claims.

I claim:

1. A shock absorber having a piston cylinder unit to provide pneumatic cushioning comprising telescoping cylinders and an hydraulically operated dash-pot for cushioning the relative movements of the cylinders in both expansion and contraction, a spring mounted on one of the cylinders so as to carry no load under normal load conditions and to carry proportionally increasing loads under loads in excess of a predetermined amount or under subnormal inflation of the cylinders, and a second spring mounted so as to oppose expansive movements of said cylinders from normal load position.

2. A shock absorber comprising an upper cylinder having a closed upper end, a lower cylinder adapted to fit outside of and telescope with the upper cylinder and having a closed lower end, a non-compressible fluid normally filling the space defined by the cylinders to a level above the bottom of the upper cylinder, means on the upper cylinder for preventing leakage of the fluid between the cylinders, a compressible fluid filling the remainder of the space within the upper cylinder, two abutments fixed with respect to the upper cylinder, a main spring extending from a point on the lower cylinder and normally terminating short of one of said abutments, whereby it will be inoperative on relatively slight shocks but effective on relatively heavy shocks to act in parallel with the compressible fluid in opposing the initial shock, and a second spring extending between a point fixed with respect to the lower cylinder and the other of said abutments to cushion the recoil from the initial shock.

Signed by me at Lowell, Massachusetts, this 2nd day of November, 1926.

JOHN A. STEVENS.